(12) United States Patent
Shah

(10) Patent No.: US 8,663,454 B2
(45) Date of Patent: Mar. 4, 2014

(54) FORMULATING A SEALANT FLUID USING GAS TO LIQUID BASE STOCKS

(75) Inventor: Ravindra R. Shah, Concord, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 742 days.

(21) Appl. No.: 12/605,153

(22) Filed: Oct. 23, 2009

(65) Prior Publication Data

US 2011/0094414 A1    Apr. 28, 2011

(51) Int. Cl.
| | |
|---|---|
| C10G 71/00 | (2006.01) |
| C10M 159/00 | (2006.01) |
| C10M 165/00 | (2006.01) |
| C10M 167/00 | (2006.01) |
| C10M 169/00 | (2006.01) |
| C10M 171/00 | (2006.01) |

(52) U.S. Cl.
USPC .............................................. 208/19; 208/18

(58) Field of Classification Search
USPC ..................................................... 208/18, 19
See application file for complete search history.

(56) References Cited

U.S. PATENT DOCUMENTS

| | | | |
|---|---|---|---|
| 5,249,812 A | 10/1993 | Volden et al. | |
| 5,529,315 A | 6/1996 | Borrino et al. | |
| 5,660,481 A | 8/1997 | Ide | |
| 6,103,099 A | 8/2000 | Wittenbrink et al. | |
| 6,655,693 B2 | 12/2003 | Hosanna et al. | |
| 6,703,356 B1 | 3/2004 | Wu | |
| 7,067,049 B1 | 6/2006 | Baillargeon et al. | |
| 2005/0133408 A1* | 6/2005 | Abernathy et al. | 208/19 |
| 2005/0133409 A1 | 6/2005 | Abernathy et al. | |
| 2006/0016724 A1* | 1/2006 | Miller et al. | 208/24 |
| 2008/0029430 A1* | 2/2008 | Loh et al. | 208/19 |

FOREIGN PATENT DOCUMENTS

WO    WO 00/14183    3/2000

* cited by examiner

*Primary Examiner* — Shuangyi Abu Ali

(74) *Attorney, Agent, or Firm* — Merchant & Gould

(57) ABSTRACT

It has been determined that sealant fluid formulations comprising a lubricant oil derived from Fischer-Tropsch waxes demonstrate performance comparable to sealant fluid comprising lubricants derived from polyalphaolefins (PAO's). The sealant fluids of the current invention can provide excellent performance properties similar to those provided by PAO based sealant fluids, but at lower cost.

14 Claims, 1 Drawing Sheet

APPLICATION: DUAL MECHANICAL SEALS

APPLICATION: DUAL MECHANICAL SEALS
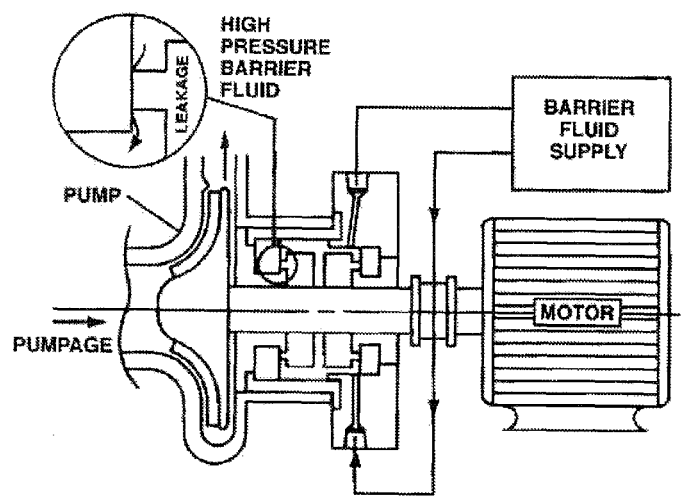

US 8,663,454 B2

FORMULATING A SEALANT FLUID USING GAS TO LIQUID BASE STOCKS

FIELD OF THE INVENTION

This invention relates to a means of preparing a sealant fluid for use in turbomachinery as a barrier or buffer fluid from gas to liquid (GTL) or coal to liquid based feed formulations, such as Fischer-Tropsch wax.

BACKGROUND OF THE INVENTION

Sealant fluids, more specifically barrier fluids and buffer fluids are the external fluids that are used in wet seals to prevent leakage of process fluids to the environment. They are used in devices such as pumps, compressors, and other types of turbomachinery in which the pressure of the process fluid is increased. A barrier fluid may also be used as a buffer fluid. A barrier fluid may be maintained at a pressure that is higher than that of the process fluid, while a buffer fluid is maintained at a pressure that is the same as or lower than that of the process fluid. The pressure employed is dependent upon the types of seals used in the machinery.

There are several purposes for using a sealant fluid, including:
(a) insulating a hazardous process fluid which should not be released to the environment;
(b) minimizing pollution problems;
(c) minimizing leaks and waste of an expensive product; and
(d) minimizing unscheduled down time.

A sealant fluid should be:
(a) compatible with the process being performed by the machinery;
(b) compatible with the seal materials;
(c) a good lubricant and heat transfer medium for the seal faces; and
(d) benign to the environment and to workers.

Sealant fluids are generally selected from the group comprising mineral oils, polyalpha olefins (PAO's), kerosene or diesel, glycols, alcohols and water. PAO based sealant fluids provide excellent performance over mineral oil diesels in terms of oxidative stability, high temperature performance and low temperature performance PAO based fluid is expensive, however. GTL based formulations have been developed that provide excellent performance at reduced costs. The GTL and CTL based formulations possess high viscosity index and low pour point, and are made using high quality base oil (see Table 1) that will soon become readily available at prices competitive to conventional Group II and Group III base oils.

BRIEF DESCRIPTION OF THE INVENTIONS

Two fluid formations suitable for use as sealant fluids in turbomachinery were developed using GTL XXL and GTL XL (see Table 1) as lubricants which were blended with additives as shown in Table 2. The performance of these products was evaluated against sealant fluid derived from polyalphaolefins (Table 2). It was found that GTL and CTL based formulations can provide comparable performance Typically PAO based sealant fluid cost is high. GTL and CTL based sealant fluids can provide excellent performance properties similar to those provided by PAO based fluids but at lower costs.

This application discloses a fluid, suitable for use in turbomachinery as a sealant fluid. It comprises: a lubricant base oil having an average molecular weight greater than 320, a viscosity index greater than 118, and a weight percent paraffinic carbons greater than 97%. The sealant fluid of this invention has a pour point of less than −60° C. and a sequence II foam tendency by ASTM D 892-03 of less than 30 ml.

We have invented a process for making a sealant fluid with very low pour point and improved foam tendencies. The process comprises the steps of a) selecting a waxy feed having greater than 75 wt % n-paraffins and less than 25 ppm total combined nitrogen and sulfur; b) hydroisomerization dewaxing the waxy feed to produce a lubricant base oil; c) fractionating the lubricant base oil into one or more fractions; d) selecting one or more of the fractions having an average molecular weight greater than 320, a viscosity index greater than 118, a weight percent olefins less than 25; and e) blending the one or more selected fractions with oil additives. The sealant fluid has a pour point of less than −60 C, a Viscosity Index of at least 129, and a sequence II foam tendency by ASTM D 892-03 of less than 30 ml.

BRIEF DESCRIPTION OF THE DRAWING

The FIGURE illustrates the manner in which barrier fluid is added to a pump and its use in preventing leakage of fluid being pumped.

DETAILED DESCRIPTION

The test methods and terminology used throughout this specification are conventional and understood by those of ordinary skill in the lubricating arts. A few are briefly mentioned in the following paragraphs.

Noack volatility is defined as the mass of oil, expressed in weight %, which is lost when the oil is heated at 250° C. with a constant flow of air drawn through it for 60 min., measured according to ASTM D5800-05, Procedure B.

"Molecules with cycloparaffinic functionality" mean any molecule that is, or contains as one or more substituents, a monocyclic or a fused multicyclic saturated hydrocarbon group.

"Molecules with monocycloparaffinic functionality" mean any molecule that is a monocyclic saturated hydrocarbon group of three to seven ring carbons or any molecule that is substituted with a single monocyclic saturated hydrocarbon group of three to seven ring carbons.

"Molecules with multicycloparaffinic functionality" mean any molecule that is a fused multicyclic saturated hydrocarbon ring group of two or more fused rings, any molecule that is substituted with one or more fused multicyclic saturated hydrocarbon ring groups of two or more fused rings, or any molecule that is substituted with more than one monocyclic saturated hydrocarbon group of three to seven ring carbons.

Molecules with cycloparaffinic functionality, molecules with monocycloparaffinic functionality, and molecules with multicycloparaffinic functionality are reported as weight percent and are determined by a combination of Field Ionization Mass Spectroscopy (FIMS), HPLC-UV for aromatics, and Proton NMR for olefins.

Oxidator BN measures the response of lubricating oil in a simulated application. High values, or long times to adsorb one liter of oxygen, indicate good stability. Oxidator BN can be measured via a Dornte-type oxygen absorption apparatus (R. W. Dornte "Oxidation of White Oils," Industrial and Engineering Chemistry, Vol. 28, page 26, 1936), under 1 atmosphere of pure oxygen at 340° F., time to absorb 1000 ml of $O_2$ by 100 g. of oil is reported. In the Oxidator BN test, 0.8 ml of catalyst is used per 100 grams of oil. The catalyst is a mixture of soluble metal-naphthenates simulating the average metal analysis of used crankcase oil. The additive package is 80 millimoles of zinc bispolypropylenephenyldithiophosphate per 100 grams of oil.

Molecular characterizations can be performed by methods known in the art, including Field Ionization Mass Spectroscopy (FIMS) and n-d-M analysis (ASTM D 3238-95 (Reapproved 2005) with normalization). In FIMS, the base oil is characterized as alkanes and molecules with different numbers of unsaturations. The molecules with different numbers of unsaturations may be comprised of cycloparaffins, olefins, and aromatics. If aromatics are present in significant amount, they are identified as 4-unsaturations. When olefins are present in significant amounts, they are identified as 1-unsaturations. The total of the 1-unsaturations, 2-unsaturations, 3-unsaturations, 4-unsaturations, 5-unsaturations, and 6-unsaturations from the FIMS analysis, minus the wt % olefins by proton NMR, and minus the wt % aromatics by HPLC-UV is the total weight percent of molecules with cycloparaffinic functionality. If the aromatics content was not measured, it was assumed to be less than 0.1 wt % and not included in the calculation for total weight percent of molecules with cycloparaffinic functionality. The total weight percent of molecules with cycloparaffinic functionality is the sum of the weight percent of molecules with monocyclopraffinic functionality and the weight percent of molecules with multicycloparaffinic functionality.

Molecular weights are determined by ASTM D2503-92 (Reapproved 2007). The method uses thermoelectric measurement of vapor pressure (VPO). In circumstances where there is insufficient sample volume, an alternative method of ASTM D2502-04 may be used; and where this has been used it is indicated.

Volatile organic content (VOC) is measured by ASTM D 2369-07. A low value is preferred. Cleveland Open Cup (COC) flash point is measured by ASTM D 92-05.

Pour point is measured by ASTM D5950-02 (Reapproved 2007), using an automatic tilt method.

The aniline point test indicates if an oil is likely to swell or shrink the elastomers (rubber compounds) that come in contact with the oil. The aniline point is called the "aniline point temperature," which is the lowest temperature (° F. or ° C.) at which equal volumes of aniline (C6H5NH2) and the oil form a single phase. The aniline point (AP) is an indicator of the amount of aromatic hydrocarbons in an oil sample. A low AP is indicative of higher aromatics, while a high AP is indicative of lower aromatics content. The aniline point is determined by ASTM D611-07. In some embodiments, lubricant base oil fractions derived from highly paraffinic wax, such as Fischer-Tropsch waxes, have a relatively low aniline point. This can be attributed to the lubricant base oil having a high ratio of molecules with monocycloparraffinic functionality to molecules with multicycloparaffinic functionality. Accordingly, the lubricant base oil fractions derived from highly paraffinic wax with low aniline points exhibit good elastomer compatibility.

The Four Ball Wear Test which measures antiwear properties is set forth in ASTM D-4172-94 (Reapproved 2004) (4-ball wear). The testing is done on a Falex Variable Drive Four-Ball Wear Test Machine. Four balls are arranged in an equilateral tetrahedron. The lower three balls are clamped securely in a test cup filled with lubricant and the upper ball is held by a chuck that is motor-driven. The upper ball rotates against the fixed lower balls. Load is applied in an upward direction through a weight/lever arm system. Loading is through a continuously variable pneumatic loading system. Heaters allow operation at elevated oil temperatures. The three stationary steel balls are immersed in 10 milliliters of sample to be tested, and the fourth steel ball is rotated on top of the three stationary balls in "point-to-point contact." The machine is operated for one hour at 75° C. with a load of 20 kilograms and a rotational speed of 1800 revolutions per minute. The lubricating oils tested generally contain all the additives typically found in an industrial oil.

Feeds used to prepare the lubricant base oil according to the process of the invention are waxy feeds containing greater than 75 weight percent normal paraffins, preferably at least 85 weight percent normal paraffins, and most preferably at least 90 weight percent normal paraffins. The waxy feed may be a conventional petroleum derived feed, such as, for example, slack wax, or it may be derived from a synthetic feed, such as, for example, a feed prepared from a Fischer-Tropsch synthesis. A major portion of the feed should boil above 650° F. Preferably, at least 80 weight percent of the feed will boil above 650° F., and most preferably at least 90 weight percent will boil above 650° F. Highly paraffinic feeds used in carrying out the invention typically will have an initial pour point above 0° C., more usually above 10° C.

Slack wax can be obtained from conventional petroleum derived feedstocks by either hydrocracking or by solvent refining of the lube oil fraction. Typically, slack wax is recovered from solvent dewaxing feedstocks prepared by one of these processes. Hydrocracking is usually preferred because hydrocracking will also reduce the nitrogen content to a low value. With slack wax derived from solvent refined oils, deoiling may be used to reduce the nitrogen content. Hydrotreating of the slack wax can be used to lower the nitrogen and sulfur content. Slack waxes possess a very high viscosity index, normally in the range of from about 140 to 200, depending on the oil content and the starting material from which the slack wax was prepared. Therefore, slack waxes are suitable for the preparation of lubricant base oils having a very high viscosity index.

The waxy feed useful in this invention has less than 25 ppm total combined nitrogen and sulfur. Nitrogen is measured by melting the waxy feed prior to oxidative combustion and chemiluminescence detection by ASTM D 4629-96. The test method is further described in U.S. Pat. No. 6,503,956, incorporated by reference herein. Sulfur is measured by melting the waxy feed prior to ultraviolet fluorescence by ASTM D 5453-00. The test method is further described in U.S. Pat. No. 6,503,956, incorporated by reference herein.

Waxy feeds useful in this invention are expected to be plentiful and relatively cost competitive in the near future as large-scale Fischer-Tropsch synthesis processes come into production. The waxy feeds may be produced from any synthesis gas, such as those made in a GTL or a CTL process, using a Fischer-Tropsch process. Synthesis gas fed to the Fischer-Tropsch process may be produced from a broad range of hydrocarbons, including waste plastic or other polymers, biomass, cellulose, vegetation, agricultural waste, waste paper or cardboard, wood, natural gas, shale or coal. Syncrude prepared from the Fischer-Tropsch process comprises a mixture of various solid, liquid, and gaseous hydrocarbons. Those Fischer-Tropsch products which boil within the range of lubricant base oil contain a high proportion of wax which makes them ideal candidates for processing into lubricant base oil. Accordingly, Fischer-Tropsch wax represents an excellent feed for preparing high quality lubricant base oils according to the process of the invention. Fischer-Tropsch wax is normally solid at room temperature and, consequently, displays poor low temperature properties, such as pour point and cloud point. However, following hydroisomerization of the wax, Fischer-Tropsch derived lubricant base oils having excellent low temperature properties may be prepared. A general description of the hydroisomerization dewaxing process may be found in U.S. Pat. Nos. 5,135,638 and 5,282,958; and U.S. patent application 20050133409.

The hydroisomerization is achieved by contacting the waxy feed with a hydroisomerization catalyst in an isomerization zone under hydroisomerizing conditions. In one embodiment, the hydroisomerization catalyst preferably comprises a shape selective intermediate pore size molecular sieve, a noble metal hydrogenation component, and a refractory oxide support. In one embodiment, the shape selective intermediate pore size molecular sieve is preferably selected from the group consisting of SAPO-11, SAPO-31, SAPO-41, SM-3, ZSM-22, ZSM-23, ZSM-35, ZSM-48, ZSM-57, SSZ-32, offretite, ferrierite, and combinations thereof SAPO-11, SM-3, SSZ-32, ZSM-23, and combinations thereof are more sometimes more preferred. In one embodiment the noble metal hydrogenation component is platinum, palladium, or combinations thereof.

The hydroisomerizing conditions depend on the waxy feed used, the hydroisomerization catalyst used, whether or not the catalyst is sulfided, the desired yield, and the desired properties of the lubricant base oil. In one embodiment, the hydroisomerizing conditions include temperatures of 260° C. to about 413° C. (500 to about 775° F.), a total pressure of 15 to 3000 psig, and a hydrogen to feed ratio from about 0.5 to 30 MSCF/bbl, or from about 1 to about 10 MSCF/bbl. In some embodiments, hydrogen will be separated from the product and recycled to the isomerization zone.

In one embodiment, the hydroisomerization conditions are tailored to produce one or more fractions having greater than 5 weight percent molecules with monocycloparaffinic functionality, or having greater than 10 weight percent molecules with monocycloparaffinic functionality. In one embodiment the fractions will have a viscosity index greater than 140 and a pour point less than zero° C. In some embodiments, the pour point will be less than −10° C.

Optionally, the lubricant base oil produced by hydroisomerization dewaxing may be hydrofinished. The hydrofinishing may occur in one or more steps, either before or after fractionating of the lubricant base oil into one or more fractions. The hydrofinishing is intended to improve the oxidation stability, UV stability, and appearance of the product by removing aromatics, olefins, color bodies, and solvents. A general description of hydrofinishing may be found in U.S. Pat. Nos. 3,852,207 and 4,673,487, incorporated herein. The hydrofinishing step may be needed to reduce the weight percent olefins in the lubricant base oil to less than 10, preferably less than 5, more preferably less than 1, and most preferably less than 0.5. The hydrofinishing step may also be needed to reduce the weight percent aromatics to less than 0.3, preferably less than 0.06, more preferably less than 0.02, and most preferably less than 0.01.

In one embodiment the hydroisomerizing and hydrofinishing conditions in the process of this invention are tailored to produce one or more selected fractions of lubricant base oil having less than 0.06 weight percent aromatics, less than 5 weight percent olefins, and greater than 5 weight percent molecules with cycloparaffinic functionality.

The lubricant base oil fractions, in one embodiment, have a very high viscosity index, generally greater than 118, but they may also have an even higher viscosity index, such as greater than an amount calculated by the equation: Viscosity Index=28*Ln(Kinematic Viscosity at 100° C., in cSt)+95; wherein Ln refers to the natural logarithm to the base 'e'. Viscosity index is determined by ASTM D 2270-04.

The lubricant base oil fractions have measurable quantities of unsaturated molecules measured by FIMS (Field Ionization Mass Spectroscopy). In one embodiment they have greater than 5 weight percent molecules with monocycloparaffinic functionality, in another embodiment they have greater than 10. In one embodiment they have a ratio of weight percent molecules with monocycloparaffin functionality to weight percent molecules with multicycloparaffinic functionality greater than 2.1, greater than 6, greater than 15, greater than 40 or greater than 100. The presence of predominantly molecules with monocycloparaffinic functionality in the lubricant base oil fractions provides excellent oxidation stability as well as desired additive solubility and elastomer compatibility. In one embodiment the lubricant base oil fractions have a weight percent olefins less than 10, less than 5, less than 1, or less than 0.5. The lubricant base oil fractions have a weight percent aromatics less than 0.3, less than 0.06, or less than 0.02.

In one embodiment the lubricant base oil fractions have low levels of alkyl branches per 100 carbons, such as less than 8 alkyl branches per 100 carbons, or less than 7. The branches are alkyl branches and in one embodiment they are predominantly methyl branches (—CH3). In addition, the alkyl branches can be positioned over various branch carbon resonances by carbon-13 NMR. The low levels of predominantly methyl branches impart high viscosity index and good biodegradability to the lubricating base oils, and sealant oils made from them.

In one embodiment the lubricant base oil fractions of this invention will have T90-T10 boiling point distributions less than 180 degrees F., such as between 50 degrees F. and less than 180 degrees F., or between 90 and less than 150 degrees F.

In some embodiments, where the olefin and aromatics contents are significantly low in the lubricant base oil fraction of the sealant fluid, the Oxidator BN of the lubricant base oil will be greater than 25 hours, preferably greater than 35 hours, more preferably greater than 40 hours. Oxidator BN is a convenient way to measure the oxidation stability of lubricating base oils. The Oxidator BN test is described by Stangeland et al. in U.S. Pat. No. 3,852,207. The Oxidator BN test measures the resistance to oxidation by means of a Dornte-type oxygen absorption apparatus. See R. W. Dornte "Oxidation of White Oils," Industrial and Engineering Chemistry, Vol. 28, page 26, 1936. Normally, the conditions are one atmosphere of pure oxygen at 340° F. The results are reported in hours to absorb 1000 ml of $O_2$ by 100 g. of oil. In the Oxidator BN test, 0.8 ml of catalyst is used per 100 grams of oil and an additive package is included in the oil. The catalyst is a mixture of soluble metal naphthenates in kerosene. The mixture of soluble metal naphthenates simulates the average metal analysis of used crankcase oil. The level of metals in the catalyst is as follows: Copper=6,927 ppm; Iron=4,083 ppm; Lead=80,208 ppm; Manganese=350 ppm; Tin=3565 ppm. The additive package is 80 millimoles of zinc bispolypropylenephenyldithio-phosphate per 100 grams of oil, or approximately 1.1 grams of OLOA 260. The Oxidator BN test measures the response of lubricating base oil in a simulated application.

High values, or long times to consume one liter of oxygen, indicate good oxidation stability. Traditionally it is considered that the Oxidator BN should be above 7 hours, but the Oxidator BN of the lubricant base oil fractions of this invention are preferably much higher.

OLOA is an acronym for Oronite Lubricating Oil Additive [R], which is a registered trademark of Chevron Oronite.

EXAMPLES

Example 1

Sample of hydrotreated Fischer-Tropsch wax made using a Fe-based Fischer-Tropsch catalyst was analyzed and found to have the properties as shown in Table I.

The Fischer-Tropsch wax was hydroisomerized over a Pt/SAPO-11 catalyst with an alumina binder. Operating conditions included temperatures between 625° F. and 695° F. (329° C. and 399° C.), LHSV of 0.6 to 1.0 hr−1, reactor pressure of 300-400 psig, and once-through hydrogen rates of between 4 and 6 MSCF/bbl. The reactor effluent passed directly to a second reactor containing a Pt/Pd on silica-alumina hydrofinishing catalyst operated at 1000 psig. Conditions in the second reactor included a temperature of about 450° F. (232° C.) a LHSV of 1.0 hr−1, and a once-through hydrogen flow rate of between 5 and 7 MSCF/bbl.

The products boiling above 650° F. were fractionated by vacuum distillation to produce distillate fractions of different viscosity grades, as shown in Table 1, below.

TABLE 1

| Classification | XXL | XL |
| --- | --- | --- |
| Kinematic Viscosity @ 40° C., cSt | 6.31 | 11.16 |
| Kinematic Viscosity @ 100° C. cSt | 2.032 | 2.988 |
| Viscosity Index | 118 | 125 |
| Cold Crank Viscosity @ −40° C., cP | 975 | 1.525 |
| Pour Point, ° C. | −57 | −36 |
| n-d-m | | |
| Molecular Weight, gm/mol (VPO) | 320 | 375 |
| Density, gm/ml | 0.7956 | 0.8059 |
| Refractive Index | 1.4453 | 1.4507 |
| Paraffinic Carbon, % | 97.82 | 96.97 |
| Naphthenic Carbon, % | 2.18 | 3.03 |
| Aromatic Carbon, % | 0.00 | 0.00 |
| Carbon, Wt. % | 85.14 | 85.23 |
| Hydrogen, Wt. % | 14.86 | 14.77 |
| Oxidator BN, hrs | 42.82 | 35.9 |
| ANTEK SULFUR | <1 | <2 |
| LOW LEVEL NITROGEN | <0.1 | <0.1 |
| Noack, wt. % | 81.9 | 26.8 |
| HPLC-UV (LUBES) | | |
| Aromatics Total | 0.00226 | 0.00261 |
| COC Flash Point, ° C. | 168 | 206 |
| SIMDIST TBP (WT %), F. | | |
| TBP @0.5 | 534 | 679 |
| TBP @5 | 588 | 701 |
| TBP @10 | 604 | 709 |
| TBP @20 | 625 | 720 |
| TBP @30 | 640 | 728 |
| TBP @40 | 652 | 735 |
| TBP @50 | 663 | 741 |
| TBP @60 | 672 | 748 |
| TBP @70 | 682 | 756 |
| TBP @80 | 692 | 764 |
| TBP @90 | 702 | 774 |
| TBP @95 | 709 | 782 |
| TBP @99.5 | 724 | 802 |
| FIMS | | |
| Alkanes | 85.4 | 75.3 |
| 1-Unsaturation | 13.6 | 23.2 |
| 2-Unsaturation | 0.5 | 1.1 |
| 3-Unsaturation | 0.2 | 0.2 |
| 4-Unsaturation | 0.1 | 0 |
| 5-Unsaturation | 0.2 | 0 |
| 6-Unsaturation | 0 | 0.2 |

Example 2

The Fischer-Tropsch derived lubricant base oils prepared above and depicted in Table 1 were blended with additives comprising antioxidant, antiwear, foam inhibitor, pour point depressant and metal deactivators, resulting in the sealant fluids of this invention, which are depicted in columns 2 and 3 of Table 2.

TABLE 2

Barrier Fluid Comparison

| IND | Barrier Fluid A | Barrier Fluid B | Barrier Fluid C | Royal Purple Barrier Fluid GT22 |
| --- | --- | --- | --- | --- |
| CHEVRON SYNFLUID (R), 4 CST | 99.3475 | | | |
| GTL Fluid-XXL | | 94.24 | | |
| GTL Fluid-XL | | | 94.24 | |
| Polyol Ester | | 5.00 | 5.00 | |
| Amine Phosphate | 0.2000 | 0.20 | 0.20 | |
| Combination of Phenolic and aminic antioxidant | 0.2000 | 0.20 | 0.20 | |
| Tolutriazol | 0.0500 | 0.05 | 0.05 | |
| Acrylic Defoamer | 0.0025 | | | |
| Triphenyl phosphorothionate | 0.2000 | .20 | .20 | |
| Silicone based Foam Inhibitor | | 0.01 | 0.01 | |
| Pour point depressant | | 0.10 | 0.10 | |
| Properties to Test: | | | | |
| API Gravity | 41.1 | 43.9 | 41.8 | |
| Saybolt Color | +30 | +30 | +30 | |
| Appearance | 1 | 1 | 1 | |
| Vis at 40 C. | 16.92 | 6.615 | 11.37 | 5 |
| Vis at 100 C. | 3.889 | 2.127 | 3.065 | 1.9 |
| VI | 125 | 129 | 132 | |
| Flash Pt, C. (F.) | 218 | 166 | 202 | 168.3 |
| Pour Point, C. (F.) | <−63 | <−63 | <−60 | −56.7 |

TABLE 2-continued

Barrier Fluid Comparison

| IND | Barrier Fluid A | Barrier Fluid B | Barrier Fluid C | Royal Purple Barrier Fluid GT22 |
|---|---|---|---|---|
| Foam, Seq, I, II and III | | | | |
| Seq I (FT) | 0 | 0 | 0 | |
| Seq I (FS) | 0 | 0 | 0 | |
| Seq II (FT) | 0 | 30 | 0 | |
| Seq II (FS) | 0 | 0 | 0 | |
| Seq III (FT) | 0 | 0 | 0 | |
| Seq III (FS) | 0 | 0 | 0 | |
| PDSC, Induction Temp ° C., 100/min; 200 psi O2 | 220 | 213 | 219 | |
| Four Ball Wear (1800 rpm, 20 k, 75 C., 1 hr), mm scar dia | 0.316 | 0.491/.382* | 0.329 | |
| VOC content, D2369, gm/lit | 4.6 | 118 | 15 | |
| Aniline Point, F. | 246.7 | 216.8 | 231.1 | |

Barrier Fluid A is a PAO based sealant fluid which contains an antiwear, antioxidant, metal deactivator and a defoamer. The PAO sealant fluid does not contain foam inhibitor or a pour point depressant. Barrier Fluids B and C are GTL based barrier fluids. Royal Purple is a commercial synthetic PAO based sealant fluid.

Overall GTL based sealant fluid will be significantly less expensive than the PAO based sealant fluid while providing comparable performance.

What is claimed is:

1. A turbomachinery sealant fluid, comprising:
    a. a lubricant base oil having:
        i. an average molecular weight between about 320 and about 375;
        ii. a viscosity index greater than 118;
        iii. weight percent olefins less than 25; and
    b. additives selected from the group consisting of antioxidants, antiwear agents, pour point depressants, foam inhibitors, metal deactivators and polyol esters, with the pour point of the sealant fluid being no higher than −60° C. and wherein the turbomachinery sealant fluid comprises at least 94 wt % of the lubricant base oil based on the turbomachinery sealant fluid.

2. The sealant fluid of claim 1, which is a barrier fluid or a buffer fluid.

3. The sealant fluid of claim 1, wherein the lubricant base oil is Fischer-Tropsch derived.

4. The sealant fluid of claim 1, wherein the lubricant base oil has an average degree of branching in the molecules less than about 10 alkyl branches per 100 carbon atoms.

5. The sealant fluid of claim 1, wherein the lubricant base oil has greater than 14 weight percent molecules with cycloparaffinic functionality, and wherein the lubricant base oil has a ratio of weight percent molecules with monocycloparaffinic functionality to weight percent molecules with multicycloparaffinic functionality greater than 13.

6. The sealant fluid of claim 1, wherein the lubricant base oil has a T90-T10 boiling range distribution of less than 100 degrees F.

7. The sealant fluid of claim 1, wherein the KV40 of the lubricant is greater than 6 cSt, and the KV100 is greater than 2 cSt.

8. The sealant fluid of claim 1, wherein the lubricant base oil has an Oxidator BN greater than 35 hours.

9. The sealant fluid of claim 1, wherein the lubricant base oil, according to n-d-M results, comprises a paraffinic carbon content greater than 97% and naphthenic carbon content greater than 2%.

10. The sealant fluid of claim 1, wherein the lubricant base oil has a NOACK volatility no greater than 81 wt %.

11. The sealant fluid of claim 1, wherein the lubricant base oil additionally has a Cleveland Open Cup flash point greater than 168 C.

12. The sealant fluid of claim 1, which has an API gravity of about 41.

13. The sealant fluid of claim 1, which has a Saybolt color equal or higher than 25.

14. The sealant fluid of claim 1, which has a kinematic viscosity at 40 C of at least 6 cSt, a kinematic viscosity at 10.degree. C. of at least 2 cSt, and a VI of at least 129.

* * * * *